(12) United States Patent
Viswanathan et al.

(10) Patent No.: US 8,743,759 B2
(45) Date of Patent: Jun. 3, 2014

(54) DETECTION OF ACCESS POINT LOCATION ERRORS IN ENTERPRISE LOCALIZATION SYSTEMS

(75) Inventors: Harish Viswanathan, Morristown, NJ (US); Ning Wen, Vernon Hills, IL (US)

(73) Assignee: Alcatel Lucent, Paris (FR)

( * ) Notice: Subject to any disclaimer, the term of this patent is extended or adjusted under 35 U.S.C. 154(b) by 995 days.

(21) Appl. No.: 12/495,058

(22) Filed: Jun. 30, 2009

(65) Prior Publication Data

US 2010/0329123 A1 Dec. 30, 2010

(51) Int. Cl.
- H04B 7/00 (2006.01)
- H04W 24/00 (2009.01)
- H04W 80/04 (2009.01)
- H04W 84/12 (2009.01)

(52) U.S. Cl.
CPC .............. *H04W 24/00* (2013.01); *H04W 80/04* (2013.01); *H04W 84/12* (2013.01)
USPC ........................................ 370/310.2; 370/252

(58) Field of Classification Search
CPC ......... H04L 2012/5608; H04W 84/12; H04W 80/04

USPC ............... 370/310.2, 332, 338, 349, 252, 328
See application file for complete search history.

(56) References Cited

U.S. PATENT DOCUMENTS 7,426,383 B2 * 9/2008 Wang et al. ................... 455/411

OTHER PUBLICATIONS

Erceg, et al., IEEE P802.11, Wireless LANs, TGn Channel Models, May 10, 2004, 45 pages.

* cited by examiner

*Primary Examiner* — Brenda H Pham
(74) *Attorney, Agent, or Firm* — Wall & Tong, LLP (57) ABSTRACT

Method and apparatus for validating location information associated with an access point (AP) in a wireless local area network (WLAN) by subjecting neighborhood node proximity information retrieved from an AP and neighborhood node location information retrieved from a database to a likelihood ratio tests (LRT). The neighborhood node proximity information retrieved from an AP comprises a list of nodes exhibiting at the AP a signal strength above a threshold level T, or link quality information associated with those nodes having a signal received by the AP.

20 Claims, 3 Drawing Sheets

DETECTION OF ACCESS POINT LOCATION ERRORS IN ENTERPRISE LOCALIZATION SYSTEMS

BACKGROUND OF THE INVENTION

With enterprises deploying wireless local area networks (WLAN) for a mobile workforce, new applications based on localization of assets and people using these wireless LANs are also taking hold. Significant increases in efficiency can potentially be realized by tracking high value assets using Wi-Fi tags in several environments including hospitals, university campus buildings and office buildings. Tracking building occupants such as patients in a hospital or employees and visitors in large office buildings enable various new services, improved productivity and safety.

Recently, localization techniques of tracked assets using wireless LANs have been proposed. Localization using WLANs is typically performed based on measurements of strength of signals received from the access points at the tag or by measuring the strength of the signals received from the tag at a few access points. Time delay of arrival is also sometimes used in location determination. Measurements from multiple access points in the neighborhood of the tag are used in a triangulation algorithm involving the known locations of the access points themselves to pin point the location of the tag.

A critical requirement for all localization algorithms is accurate knowledge of the location of the access points themselves. The location engine associated with a localization application uses a database that maps access points to their physical locations. However, for a variety of reasons there could be errors in the locations of the access points in the database. For example, at the deployment phase the location of an access point could be incorrectly entered into the database, or an access point might be moved subsequently without an update to the location database.

Thus, errors in location information associated with access points impart further errors within the context of localization techniques such as those associated with asset tracking applications.

Unfortunately, the correction of location errors by determining locations via triangulation is limited to those network configurations where there are a sufficient number of neighborhood nodes or access points to enable useful triangulation determinations. Many network installations simply do not provide a sufficiently node density to allow this technique.

SUMMARY OF THE INVENTION

Various deficiencies of the prior art are addressed by new methods and techniques to automatically detect errors associated with location information pertaining to, illustratively, wireless local area network (WLAN) access points such as stored within the database supporting a localization application.

A method according to one embodiment for validating location information associated with an access point (AP) in a wireless local area network (WLAN) comprises subjecting neighborhood node proximity information retrieved from an AP and neighborhood node location information retrieved from a database to a likelihood ratio tests (LRT) in which the likelihood that the location as recorded in the database is correct is compared to the likelihood that the location as recorded in the database is incorrect.

In one embodiment, the neighborhood node proximity information retrieved from an AP comprises a list of nodes exhibiting at the AP a signal strength above a threshold level T.

In one embodiment, the neighborhood node proximity information retrieved from an AP comprises link quality information associated with those nodes having a signal received by the AP.

A method according to one embodiment for validating location information associated with an access point (AP) in a wireless local area network (WLAN) comprises retrieving from the database neighborhood node location information associated with the AP; and comparing the neighborhood node location information received from the database to neighborhood node proximity information received from the AP to determine thereby whether the neighborhood node location information received from the database includes any errors.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

The present invention will be described within the context of a wireless local area network (WLAN) comprising a plurality of wireless network nodes or access points (APs). A database (either remote or associated with one or more nodes) stores information pertaining to the network and its nodes, the information including physical location information associated with each node. In addition, the database stores information relating to various nodes, such as the identity of nodes that are within one or more hops from a particular node. Various embodiments operate to detect location errors and/or validate location information within the database, such information being susceptible to errors within the context of data entry errors and/or subsequent node relocation.

The systems and methodologies discussed herein provide critical database validation within the context of, illustratively, enterprise applications in hospitals (e-health), office buildings, retail and various other locations where localization applications are used. This rapid automatic detection/correction of errors minimizes service disruption time.

Figure 1:
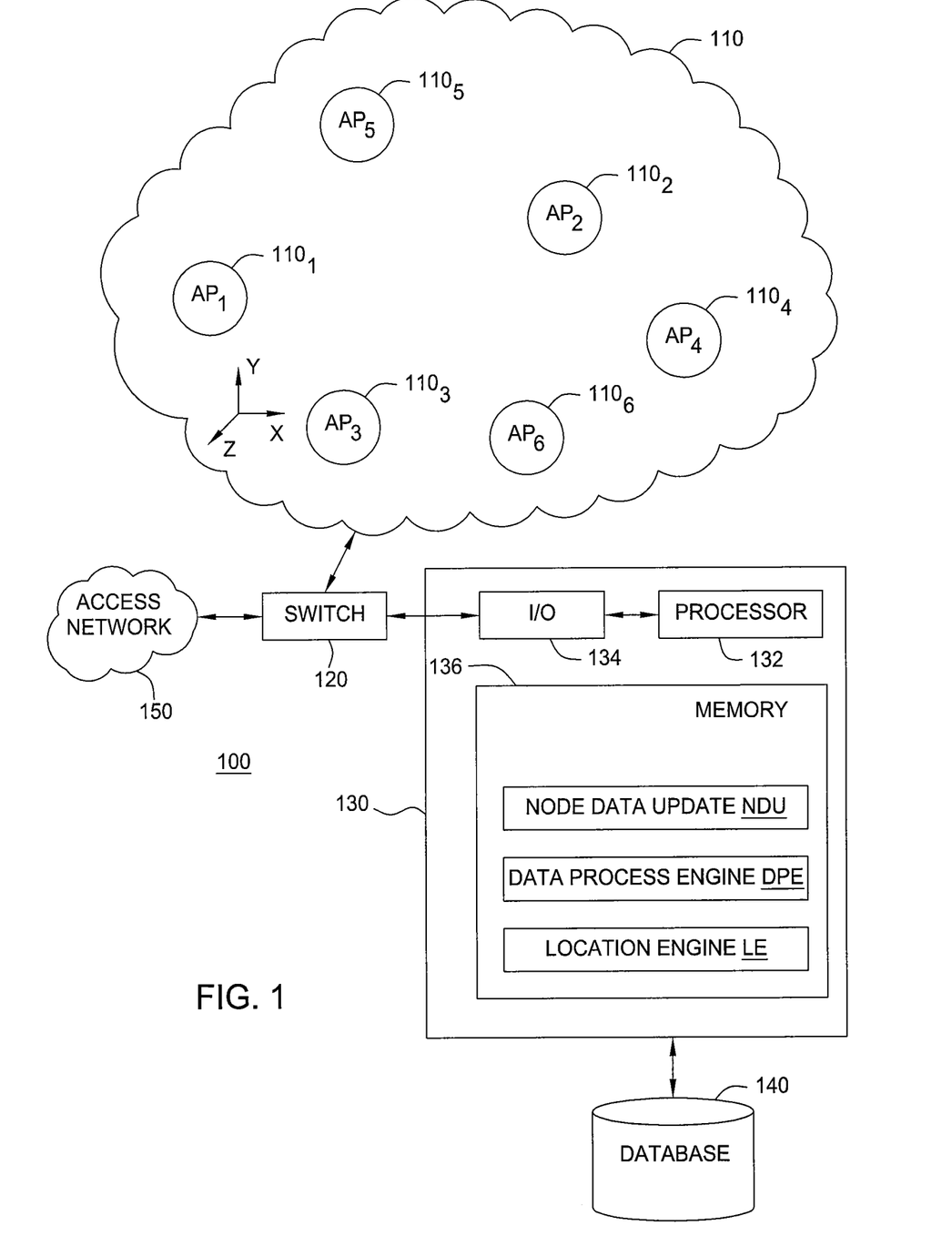
FIG. 1 depicts a high-level block diagram of a system according to one embodiment.

FIG. 1 depicts a high-level block diagram of a system according to one embodiment. Specifically, the system 100 of FIG. 1 comprises a wireless local area network (WLAN) 110, a switch 120, a controller 130 and the database 140. It will be appreciated by those skilled in the art that the system 100 of FIG. 1 is simplified to facilitate description of the various embodiments. Dramatically more complex (or simple) networks may be employed within the context of the present invention.

Wireless LAN 110 is formed by a plurality of access points (APs) denoted as access points $110_1$, $110_2$ and so on through $110_6$ (collectively access points 110). The access point may operate according to any wireless LAN protocol (802.11, WiMax, proprietary wireless network/protocol and so on), and further according to any node to node configuration (peer-to-peer, ad hoc and the like). The wireless protocol, configuration and so on associate with the wireless LAN 110 is flexible within the context of the various embodiments.

The switch 120 may comprise any data switch, router, bridge and the like. The switch 120 may perform various data routing functions, such as routing data to and from an optional access network 150 and/or the Internet. The switch 120 also routes data to and from the controller 130.

The controller 130 is presented as a general purpose computing element adapted to perform the various processing tasks described herein The controller 130 implements various management functions, methodologies and techniques according to the various embodiments. The controller 130 communicates with the database 140, which stores information pertaining to the access points 110 forming a wireless LAN.

In one embodiment, the controller 130 comprises a processor 132 as well as memory 136 for storing various control programs and other programs as well as data. The memory 136 may also store an operating system supporting the various programs.

The processor 132 cooperates with conventional support circuitry such as power supplies, clock circuits, cache memory and the like as well as circuits that assist in executing the software routine stored in the memory 136. As such, it is contemplated that some of the steps discussed herein as software processes may be implemented within hardware, for example as circuitry that cooperates with the processor 132 to perform various steps. The controller 130 also contains input/output (I/O) circuitry 134 which forms an interface between the various functional elements communicating with the controller 130.

The controller 130 operates to perform certain functions as described herein with respect to the various embodiments. The controller 130 is depicted as being a standalone controller or management device in FIG. 1. However, it will be appreciated by those skilled in the art that controller 130 may perform the same functions while being associated with any one or more of the access points 110 forming the wireless LAN. Similarly, the controller 130 may perform the same functions while being located remotely from the wireless LAN 110, such as via the Internet or access network 150.

Various embodiments may be implemented as a computer program product wherein computer instructions, when processed by a computer, adapt the operation of the computer such that the methods, data structures and/or techniques of the present invention are invoked or otherwise provided. Instructions for invoking the inventive methods may be stored in fixed or removable media, transmitted via a data stream in a broadcast media, and/or stored within a working memory within a computing device operating according to the instructions.

Each of the access points 110 is capable of communicating with one or more of the other access points nearby. Nearby or proximate nodes capable of communicating directly with an access point are said to be one hop away from the access point. Similarly, nodes that are capable of communicating with an access point via an intermediary access point are said to be two hops away from the access point. Generally speaking, the number of hops associated with communication between a first access point and a second access point is equal to one more than the number of intermediate nodes between the first and second access points required for such communication.

Each of the access points 110 includes circuitry similar to that described above with respect to the controller 130. That is, each AP 110 includes input output, processor and memory functionality suitable for implementing the various functions, methodologies and actions discussed herein with respect to the access points 110. Thus, whether an AP 110 comprises a router, switch, bridge or other network component, it will be understood and appreciated by those skilled in the art that the AP 110 is a computing/communications device capable of implementing hardware, software and/or combination of hardware and software based instructions. In particular, each of the access points 110 gathers neighborhood data pertaining to other proximate access points 110 which form a group or neighborhood of access points 110. This gathering of neighborhood data is described in one embodiment below with respect to FIG. 2.

The database 140 stores information pertaining to the access points or nodes 110 forming the wireless LAN. For each access point, specific location information is stored. The physical "address" or location information may comprise a specific XYZ coordinate, and XYZ offset coordinate associated with a known location, a GPS coordinate or any other position indicative coordinate suitable for defining the location of a wireless access point 110 within a building or other structure. The location information associated with each access point is entered (typically) into the database during the design phase of the wireless LAN. Upon installation of the wireless LAN nodes forming the access points 110, the location data associated with the access points 110 should be adjusted as necessary. Initial data entry errors, data entry errors during subsequent adjustments, differences in actual installation location and/or subsequent move of access points will likely result in access point location errors within the database 140. In addition to location information, other information is optionally stored.

In one embodiment, the database 140 includes for each AP a list of the other APs within 1-hop, 2-hops and/or 3-hops (or more) of the access point.

In one embodiment, the database 140 includes signal strength information associated with or expected from each of the access points within the list of other access points.

The memory 136 of the processor 130 is depicted as including a node data update (NDU) engine, a data processing engine DPE and a location engine LE.

The location engine LE provides location data to localization applications, which may utilize the physical address of wireless network nodes within the context of asset tracking, patient tracking and other applications. As previously noted, to perform their intended function such localization applications and algorithms require accurate knowledge of the location of the access points 110 within the wireless LAN. The location engine computes the location of the assets and forwards the location information to the localization applications The NDU engine receives neighborhood data from each of the nodes or access points in a network. The neighborhood data is provided by the nodes either individually or via other network controllers. In one embodiment, neighborhood data associated with a specific node comprises a listing of those nodes proximate the specific node that exhibit a received signal strength above a threshold level. In another embodiment, the neighborhood data associated with a specific node further includes information pertaining to the proximate nodes exhibiting signal strength above the threshold level. Such information may comprise one node identification, capability, utilization level and so on. Generally speaking, the neighborhood data associated with each node is provided by that node to the controller for subsequent processing.

Figure 2:
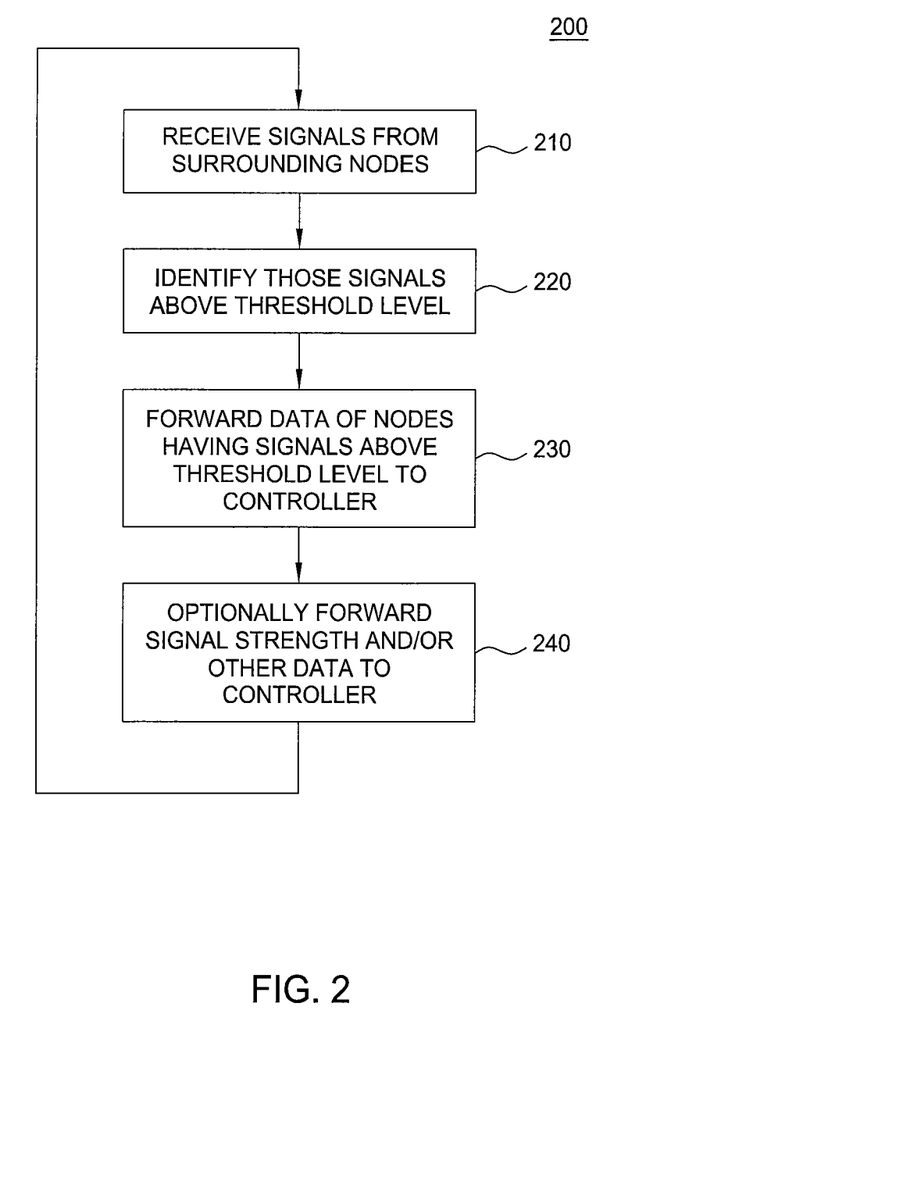
FIG. 2 depicts a flow diagram of a node signaling method suitable for use in the system of FIG. 1.

FIG. 2 depicts a flow diagram of a node signaling method suitable for use in the system of FIG. 1. Specifically, FIG. 2 depicts a flow diagram of a node signaling method suitable for use by nodes are access points 110 providing neighborhood data to the controller 130 in the system 100 of FIG. 1.

The node signaling methodology 200 depicted in FIG. 2 is periodically executed by each node or access point (AP) within the network. The data provided to the controller 130 during execution of the methodology 200 by each node is used to update location information associated with that node. For example, in one embodiment the controller 130 updates an adjacency matrix which includes information about each node and the corresponding proximate neighborhood of nodes. The adjacency matrix may include a simple list of proximate nodes forming the neighborhood and/or a more detailed list including proximate node identification data, capability data, utilization data and so on. Specific information stored within the context of an adjacency matrix will be discussed in more detail below.

Referring to FIG. 2, at step 210, the node receives signals from surrounding or neighboring nodes. At step 220, the surrounding or neighborhood nodes associated with those signals having a signal strength above a threshold signal level are identified. At step 230, the node data of those nodes having signals above the threshold level (i.e., the neighboring nodes) is transmitted to the controller by the node executing the method 200. Optionally, at step 240 the actual signal strength measurement and/or other data associated with surrounding nodes is transmitted to the controller by the node executing the method 200. That is, at steps 230/240 the node or AP receiving signals from surrounding nodes transmits to the controller 230 proximity information associated with those signals, including, for example, proximate node identification data, proximate node signal strength data and the like.

The data processing engine DPE performs data processing functions, such as described herein with respect to the various embodiments. The DPE utilizes neighborhood data and other data to determine whether or not location information within database 140 is accurate. The various methodologies and algorithms described herein with respect to the various embodiments are primarily executed within the context of the DPE.

The various embodiments discussed herein automatically detect location errors within the database 140 using neighbor node information collected from the various access points forming the wireless LAN.

In one embodiment, the neighbor node information comprises a list of the n-hop nodes associated with a particular node. For example, assume that a node number 15 is one hop away from each of nodes 17 through 20. In this example, actual receiver measurements at node 15 should indicate at least a minimal or threshold level of communications between node 15 and each of nodes 17 through 20. Similarly, actual receiver measurements at each of nodes 17 through 20 should indicate at least a minimal or threshold level of communication with node 15.

The controller 130 receives and processes the neighborhood node information from each of the nodes forming the network to identify location data associated with the nodes within the database 140. The operations of the controller 130 will now be described with respect to a system model that generally defines the environment within which the embodiments are provided, as well as several likelihood ratio tests (LRTs) used in the various embodiments for evaluating location information.

Figure 3:
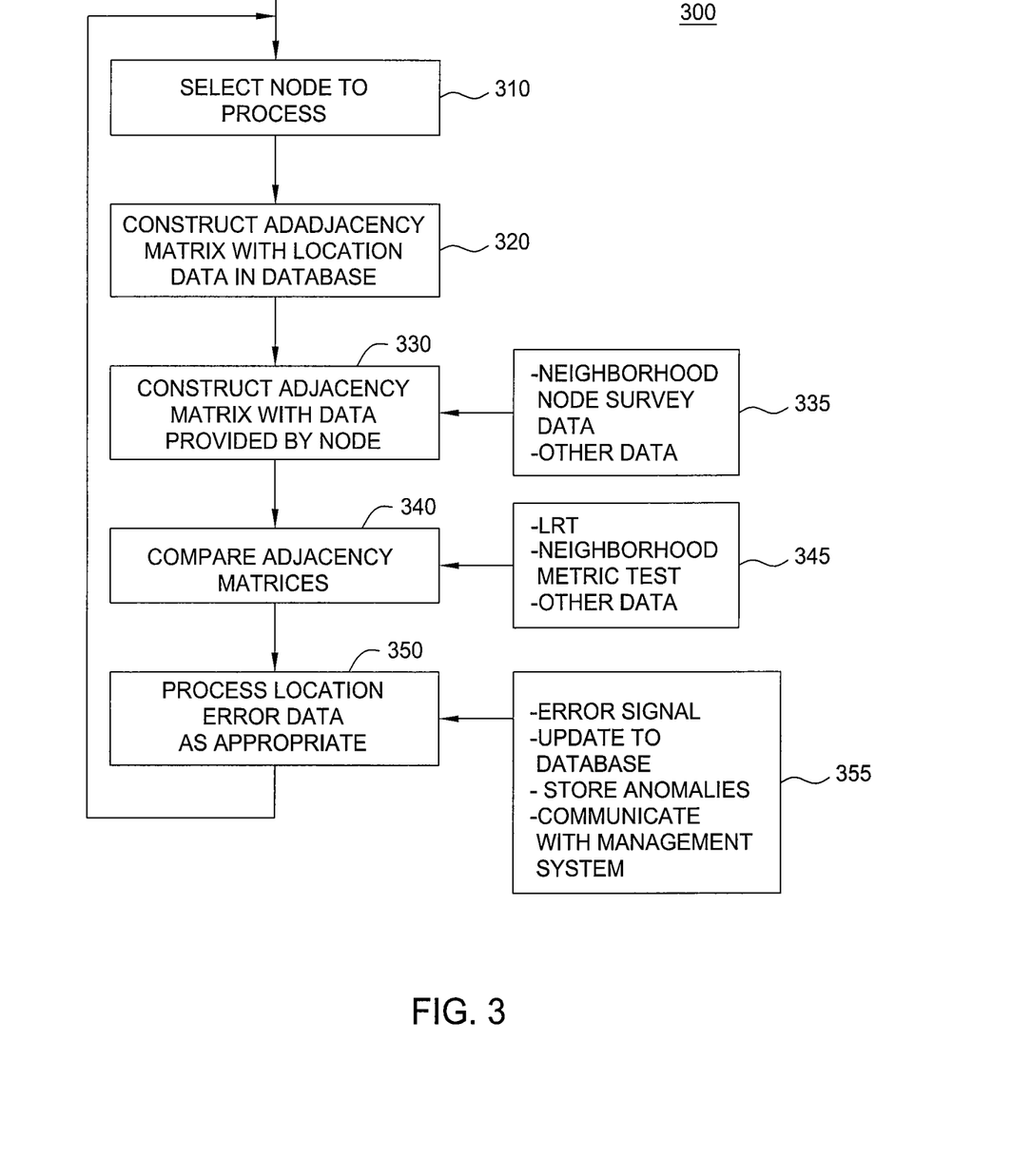
FIG. 3 depicts a flow diagram of a location data verification method suitable for use in the system of FIG. 1.

FIG. 3 depicts a flow diagram of a location data verification method suitable for use in the system of FIG. 1. The method 300 is suitable for execution within the controller 130 of the system 100 FIG. 1. A method 300 is centered at step 310 when a node to process is selected. At step 320, an adjacency matrix is constructed using location data stored within the database 140 and associated with the node to be processed. At step 330, an adjacency matrix is constructed using data received from the node or AP to be processed. Referring to box 335, the received location data may comprise survey data from the selected node and/or other nodes within the network (e.g., such is provided via the methodology 200 of FIG. 2), measured signal strength data, quality of service (QoS) data or other data.

At step 340, the database-related adjacency matrix is compared to the measured or survey data-related adjacency matrix. Generally speaking, step 340 operates to identify inconsistencies between the two adjacency matrices to identify thereby likely location errors within the database 140. Referring to box 345, the comparison process of step 340 is performed using a likelihood ratio test (LRT) such as the neighborhood metric test or other test such as described herein with respect to the various embodiments. For example, adjacency matrices may be constructed and compared using location/proximity information, location/signal information and so on.

At step 350, location error within the database 140 is processed as appropriate. Referring to box 355, such processing may comprise generating error signals, updating the database 140, storing information indicative of the various discovered anomalies in memory (e.g., memory 136 of controller 130, memory within the database 140, memory within the switch 120 or any of the nodes 110). The location error processing of step 350 may also include communication with a management system such as an element management system (EMS) or network management system (NMS). Updated localization information may also be provided to the location engine LE such that location data already extracted from the database 140 by the location engine LE may be updated.

In one embodiment, the location data within the database is used to construct a first adjacency matrix listing the nodes that should be within one hop of a particular node or AP. Other embodiments use 2, 3 or more hop data. The particular node or AP measures received signal strengths from neighboring access points or nodes to identify thereby proximate APs/nodes (e.g., APs/nodes having a signal strength above a threshold level). The proximate AP/node information is used to construct a second adjacency matrix. Comparing the database-derived location matrix and the measurement-derived proximity matrix to identify dissimilarities reveals location database errors.

In one embodiment, this comparison is made using signal strength and/or other data associated with the various nodes. In one embodiment, highly accurate processing functions are invoked by the controller 130 to perform detailed comparisons. In other embodiments, reduced complexity processing functions are invoked by the controller 130.

This approach to detection of location errors in the database is based on hypothesis testing one node at a time. The likelihood of the measured link gains under the two hypotheses: namely, that the location as recorded in the database of the node under test is the correct physical location, and that the location as recorded in the database of the node under test is an incorrect physical location. Each node in the network determines neighbor nodes to which it is connected according to the link quality threshold criterion and informs this to the central processor performing the test.

In one embodiment, this comparison is performed using the teachings described below with respect to the likelihood ratio tests described below, such as with respect to equation 6.

In one embodiment, the algorithm described below with respect to equation 6 is periodically executed within the controller 130 for each node in the network to determine if there is a location error. It is noted that a communications threshold T used in the algorithm may also be determined based on the propagation parameters.

System Model

In one embodiment the network comprises a plurality of access points or nodes that are located randomly in a given area, such as with an ad hoc wireless network. In this embodiment or model, for the purposes of identifying neighbors of nodes, any two nodes are deemed to be connected if the link quality of the wireless channel between them exceeds a certain threshold level.

In this embodiment there is no need for these nodes to communicate with each other for the purposes of determining location errors. The nodes can communicate the neighbor information to a central controller or simply through a wired network to which they are connected. Assuming an indoor system, the channel gain is modeled as path-loss plus log-normal shadow fading. Furthermore, the channel is assumed to be symmetric between any two nodes.

It is assumed for simplicity that multipath fading can be averaged out from the received signal to obtain an average link quality that is independent of the multipath fading effects. Thus, for a typical SISO system, the path loss model consists of the free space loss $L_{FS}$ (slope of 2) up to a breakpoint distance $d_{BP}$ and slope of 3.5 after the breakpoint distance. Different breakpoint distances may be chosen for different models. Thus, the path-loss in dB between two nodes with distance x can be expressed as:

$$L(x) = \begin{cases} L_{FS}(x) & \text{if } x \le d_{BP}; \\ L_{FS}(d_{BP}) + 35\log_{10}(x/d) & \text{if } x > d_{BP}. \end{cases} \quad (\text{eq. 1})$$

The channel gain in dB form can be given by $H(x)=-L(x)+N(0,\sigma)$, where $N(0,\sigma)$ is a Gaussian random variable with mean 0 and standard deviation $\sigma$. The values of $\sigma$ under different models for networks adhering to the 802.11 specifications may be found in the paper entitled the May 2004 paper entitled "IEEE P802.11 Wireless LANs TGn Channel Models," which is incorporated herein by reference in its entirety.

In order to identify the mislabeled nodes, the relationship between node link qualities and physical locations is established. For simplicity, it is assumed that all the nodes use the same transmission power such that the link quality is measured in terms of the channel gain. Those skilled in the art and informed by the teachings of the present disclosure will readily understand that measurement offsets and/or scaling may be required.

It is assumed that any two nodes are connected if the link quality of the channel between the nodes exceeds a certain threshold, and that the channel between two nodes is modeled as a distance dependent path-loss plus log-normal shadow fading. The maximal distance where the path-loss is less than the threshold can be treated as a nominal communication range, and it will be denoted by d in the rest of the paper. The corresponding link quality threshold in dB is $-L(d)$. Connectivity information from the location database is simply based on the distance between nodes. If the distance between two nodes is smaller than the communication range d, they are assumed to be connected. Connectivity from measurement is based on the measured link quality. If the link quality exceeds $-L(d)$ the nodes are assumed to be connected.

Likelihood Ratio Test (LRT)

The present embodiments detect location errors in the database by testing nodes individually and then determining the likely localization errors. A likelihood of measured link gains is determined under two hypotheses; namely, (1) that the location as recorded in the database of the node under test is the correct physical location; and (2) that the location as recorded in the database of the node under test is the incorrect physical location. A ratio of the two likelihoods is then utilized as discussed herein.

In one embodiment, a first determination of the two likelihoods is made by assuming that only connectivity information is fed back to the controller. That is, each node in the network determines neighbor nodes to which it is connected according to the link quality threshold criterion and forwards this information to the controller performing the likelihood test. The actual link gains measured are assumed in this embodiment to be unavailable for decision making. This embodiment is useful in part because it is usually not possible to accurately measure link qualities for links from distant nodes, and because using only threshold pass/fail criteria reduces the amount of information that is required to be sent from each of the nodes.

In another embodiment, the actual link gains are available for decision making. In a variation of this embodiment, the link gains are quantized to two levels such that the likelihood test complexity is reduced to one based only on connectivity.

LRT Based on Connectivity Observations

Assuming that information from a node 1 being tested comprises only connectivity information (i.e., no link gain information), then the locations of all the other nodes are observed through the database, and the connectivities are observed based on the link quality. Other mislabeled nodes are ignored for the moment, since the number of mislabeled notes is likely much smaller than the total number of nodes.

Let $(X_j, Y_j)$ denote the location of node j, and let random variable $Z_{1j}$ denote the connectivity between node 1 and node j. $Z_{1j}=1$ if node 1 and node j are connected, and $Z_{1j}=0$ otherwise. Notice that the node locations are typically independent and identically distributed (iid) uniform random variables for different nodes, and connectivities are also independent across different nodes. Given the database location of node 1 $(x'_1, y'_1)$ and a set of observations from the database on the node locations and the connectivities $\{(x_j, y_j), z_{1j}\}$, j=2 ... N the generalized likelihood ratio of whether node 1's location in the database is correct is given by:

$$\Delta = \frac{L_1}{L_0} \quad \text{(eq. 2)}$$

$$= \frac{Pr\left\{\begin{array}{l}(X_j, Y_j) = (x_j, y_j), Z_{1j} = z_{1j}, \\ j = 2, \ldots, N \mid (X_1, Y_1) = (x'_1, y'_1)\end{array}\right\}}{\max_{(x_1, y_1)} Pr\left\{\begin{array}{l}(X_j, Y_j) = (x_j, y_j), Z_{1j} = z_{1j}, \\ j = 2, \ldots, N \mid (X_1, Y_1) = (x_1, y_1)\end{array}\right\}}$$

$$= \frac{\prod_{j=2}^{N} Pr\left\{\begin{array}{l}(X_j, Y_j) = (x_j, y_j), \\ Z_{1j} = z_{1j} \mid (X_1, Y_1) = (x'_1, y'_1)\end{array}\right\}}{\max_{(x_1, y_1)} \left\{\prod_{j=2}^{N} Pr\left\{\begin{array}{l}(X_j, Y_j) = (x_j, y_j), \\ Z_{1j} = z_{1j} \mid (X_1, Y_1) = (x_1, y_1)\end{array}\right\}\right\}}.$$

By comparing $\Delta$ to a threshold $T_\Delta$, the likelihood ratio test is achieved. The test result is that the database location of node 1 is correct if $\Delta \leq T_\Delta$, and it is not correct otherwise.

To compute the likelihood $L_0$ of node 1 being mislabeled, the location which maximizes the likelihood is required. Finding the analytical expression of this location is not trivial, and computing the numerical value has high complexity. Notice that the location that maximizes the likelihood should be close to the actual location of node 1. Thus, it is desired to remove the maximization of $L_0$ and use the actual location $(x_1, y_1)$. Of course, the actual location is unknown from the observations. Here, we assume $(x_1, y_1)$ is known, but it will be seen this is not necessary in the actual computation of the likelihood ratio in the limit of a large number of nodes in the network. It is noted that the node locations $(X_j, Y_j)$'s are iid random variables, and hence $Z_{1j}$ is a binary random variable depending on $(X_j, Y_j)$. But considering the three-tuple random variable $(X_j, Y_j, Z_{1j})$ defined for node j, it is again independent and identically distributed across nodes conditional on the known $(x_1, y_1)$ value (ignoring boundary effects).

Reduced Complexity LRT Based on Connectivity

Since the number of nodes may be very large, in one embodiment an approximation to the above tests is used that is easier to compute. Applying the Asymptotic Equipartition Property (AEP) to the locations and connectivities sequence $(X_j, Y_j, Z_{1j})$'s, for any realization $(x_j, y_j, z_{1j})$'s, the following is provided:

$$-\frac{1}{N-1}\log_2 Pr\left\{\begin{array}{l}(X_j, Y_j) = (x_j, y_j), \\ Z_{1j} = z_{1j} \mid (X_1, Y_1) = (x_1, y_1)\end{array}\right\} \to H_{XYZ}, \quad \text{(eq. 3)}$$

where the convergence is almost surely, and $H_{XYZ}$ is the entropy (note that the unit of entropy is a bit) drawn from the distribution of $(X_j, Y_j, Z_{1j})$ conditional on the known $(x_1, y_1)$.

$L_0$ can thus be approximated by $2^{-(N-1)H_{XYZ}}$. It is noted that the approximation does not depend on the actual position of node 1. Therefore, comparing $\Delta$ in (2) with certain threshold $T_\Delta$ is equivalent to comparing $L_1$ with $T_1 = 2^{-(N-1)H_{XYZ}} T_\Delta$.

Now let $S_1$ and $S_0$ denote the sets of nodes connected and disconnected to node 1, respectively. It is noted that the locations of all the nodes are independent. Using the same notations $d'_j$ to represent the distances between node j and the database location of node 1 as in the previous section, the likelihood that node 1 is correctly labeled $L_1$ is given by $$L_1 = \prod_{j=2}^{N} Pr\left\{\begin{array}{l}(X_j, Y_j) = (x_j, y_j), \\ Z_{1j} = z_{1j} \mid (X_1, Y_1) = (x_1, y_1)\end{array}\right\} \quad \text{(eq. 4)}$$

$$= \prod_{j=2}^{N} Pr\left\{\begin{array}{l}\{Z_{1j} = z_{1j} \mid (X_1, Y_1) = (x_1, y_1), \\ (X_j, Y_j) = (x_j, y_j)\}\end{array}\right\}$$

$$Pr\{(X_j, Y_j) = (x_j, y_j)\}$$

$$= \frac{1}{A^{N-1}} \prod_{j=2}^{N} Pr\left\{\begin{array}{l}\{Z_{1j} = z_{1j} \mid (X_1, Y_1) = (x_1, y_1), \\ (X_j, Y_j) = (x_j, y_j)\}\end{array}\right\}$$

$$= \frac{1}{A^{N-1}} \prod_{j \in S_1} Pr\{-L(d'_j) + N(0, \sigma) < -L(d)\}$$

$$\prod_{j \in S_0} Pr\{-L(d'_j) + N(0, \sigma) > -L(d)\}$$

$$= \frac{1}{A^{N-1}} \prod_{j \in S_1} \Phi\left(\frac{10\rho}{\sigma} \log_{10} \frac{d'_j}{d}\right)$$

$$\prod_{j \in S_0} \Phi\left(-\frac{10\rho}{\sigma} \log_{10} \frac{d'_j}{d}\right),$$

where $1/A$ is because of the uniform distribution of the location of nodes in an area A, and $\Phi$ is the cumulative distribution function (CDF) of the zero mean, unit variance normal distribution. $\rho$ is the path loss exponent under the simplifying assumption of a single slope model.

Comparing $L_1$ to threshold $T_1$ is equivalent to comparing $\log L_1$ to $\log T_1$. Thus the following test metric is considered:

$$\log L_1 = \quad \text{(eq. 5)}$$

$$\log \frac{1}{A^{N-1}} + \sum_{j \in S_1} \log \Phi\left(\frac{10\rho}{\sigma} \log_{10} \frac{d'_j}{d}\right) + \sum_{j \in S_0} \log \Phi\left(-\frac{10\rho}{\sigma} \log_{10} \frac{d'_j}{d}\right).$$

LRT Based on Connectivity Using Neighborhood Metric Test

The likelihood ratio test can be performed as described above with respect to equation 5. Since the number of nodes, N, is typically large, calculating the likelihood for each node using equation 5 is a task with high computational complexity. Therefore, in a further embodiment, a reduced complexity methodology is herein provided. The reduced complexity methodology provides further simplification (with respect to equation 5), while still maintaining accuracy. It is noted that to reduce the amount of overhead only the quantized connectivity information is considered.

Specifically, consider the node $j \in S_1$.

If $d'_j > d$, then $\log \Phi\left(\frac{10\rho}{\sigma} \log_{10} \frac{d'_j}{d}\right) > \log \frac{1}{2}$;

if $d'_j \leq d$, then $\log \Phi\left(\frac{10\rho}{\sigma} \log_{10} \frac{d'_j}{d}\right) < \log \frac{1}{2}$.

For node $j \in S_0$, if $d'_j > d$, then $\log \Phi\left(\frac{10\rho}{\sigma} \log_{10} \frac{d'_j}{d}\right) < \log \frac{1}{2}$;

if $d'_j \leq d$, then $\log \Phi\left(\frac{10\rho}{\sigma} \log_{10} \frac{d'_j}{d}\right) > \log \frac{1}{2}$.

Notice that $d'_j > d$ represents node 1 and j are disconnected due to the database information, and $d'_j < d$ means the two are connected. Thus, we consider the following neighborhood metric test, which is a quantized version of the likelihood ratio test and requires much simpler computation.

The neighborhood metric test for node 1 is defined as follows. Let $a_{1j}^{DB}$ and $a_{1j}^{LQ}$ denote the connectivities of node 1 and j based on the location and link quality measurements, respectively. And $a_{1j}^{DB}$ ($a_{1j}^{LQ}$) equals 1 if node 1 and j are connected, and 0 otherwise. Thus, the neighborhood metric test for node 1 can be expressed as:

$$m_1^n = \sum_{1 \leq j \leq N, j \neq 1} |a_{1j}^{DB} - a_{1j}^{LQ}|. \quad \text{(eq. 6)}$$

Let $T^n$ denote the decision threshold for the neighborhood metric. Then the node is claimed to be mislabeled if $m_1^n > T^n$ and correctly labeled otherwise.

Notice $a_{1j}^{LQ}$ is the same as that of $z_j$. $a_{1j}^{LQ} = 1$ for $j \in S_1$, and $a_{1j}^{LQ} = 0$ for $j \in S_0$. And $a_{1j}^{DB} = 0$ implies $d'_j > d$, while $a_{1j}^{DB} = 1$ implies $d'_j \leq d$.

Now consider the node $j \in S_1$, where $a_{1j}^{LQ} = 1$. If $d'_j > d$, then $$\log \Phi \left( \frac{10\rho}{\sigma} \log_{10} \frac{d'_j}{d} \right) > \log \frac{1}{2},$$

$a_{1j}^{DB} = 0$, and the neighborhood metric $m_{1j}^n = 1$; if $d'_j \leq d$, then $$\log \Phi \left( \frac{10\rho}{\sigma} \log_{10} \frac{d'_j}{d} \right) < \log \frac{1}{2},$$

$a_{1j}^{DB} = 1$, and the neighborhood metric $m_{1j}^n = 0$. For node $j \in S_0$, similar results are yielded.

Therefore, for any j, $m_{1j}^n = 1$ corresponds to $$\log \Phi \left( \frac{10\rho}{\sigma} \log_{10} \frac{d'_j}{d} \right) > \log \frac{1}{2},$$

and $m_{1j}^n = 0$ corresponds to $$\log \Phi \left( \frac{10\rho}{\sigma} \log_{10} \frac{d'_j}{d} \right) < \log \frac{1}{2}.$$

We can thus conclude that the neighborhood metric testing is equivalent to a quantized version of the likelihood ratio testing.

LRT Based on Link Gain Observations

In various embodiments discussed above, the likelihood ratio test used is based on the connectivity observation. However, some of the information is lost due to the quantization on the link quality. In other embodiments discussed herein, the likelihood ratio test is based on the actual link quality.

As before the focus of inquiry is on the location of a node 1 and an assumption that the correct locations of other nodes are observed from the database. Let $(X_j, Y_j)$ s denote the location random variables, and let $(x_j, y_j)$ denote the observations.

Now let $S_{1j}$ denote the link quality between node 1 and node j in terms of the signal strength, and let $s_{1j}$ denote the observation for a particular realization. Notice the independence of the signal strength across nodes conditional on the known location of node 1, now the generalized likelihood ratio can be written as $$\Delta = \frac{L_1}{L_0} \quad \text{(eq. 7)}$$

$$= \frac{\prod_{j=2}^{N} Pr \left\{ S_{1j} = s_{1j} \mid (X_1, Y_1) = (x'_1, y'_1) \right\}}{\max_{(x_1, y_1)} \left\{ \prod_{j=2}^{N} Pr \left\{ S_{1j} = s_{1j} \mid (X_1, Y_1) = (x_1, y_1) \right\} \right\}}.$$

Finding the location which maximizes $L_0$ is not trivial, and as before the actual location $(x_1, y_1)$ of node 1 is used to estimate that location. Let $d_j$ denote the observed distance between node 1 and j. This provides the following equations:

$$L_0 = \prod_{j=2}^{N} Pr \left\{ \begin{array}{l} \{(X_j, Y_j) = (x_j, y_j), \\ S_{1j} = s_{1j} \mid (X_1, Y_1) = (x_1, y_1) \} \end{array} \right\} \quad \text{(eq. 8)}$$

$$= \frac{1}{A^{N-1}} \prod_{j=2}^{N} Pr \left\{ \begin{array}{l} \{S_{1j} = s_{1j} \mid (X_1, Y_1) = (x_1, y_1), \\ (X_j, Y_j) = (x_j, y_j)\} \end{array} \right\}$$

$$= \frac{1}{A^{N-1}} \prod_{j=2}^{N} Pr\{N_j = s_{1j} + L(d_j)\},$$

where $N_j$ denotes the shadow fading component for the link between 1 and j. The shadow fading component for each link follows the same zero mean Gaussian distribution with standard deviation $\sigma$.

Now $L_0$ can be interpreted as the probability of a sequence of iid Gaussian random variables. As N becomes large, applying AEP yields $$-\frac{1}{N-1} \log_2 \prod_{j=2}^{N} Pr\{N_j = s_{1j} + L(d_j)\} \to H_\sigma, \quad \text{(eq. 9)}$$

where the convergence is almost surely, and $H_\sigma$ is the differential entropy drawn from the Gaussian distribution with standard deviation $\sigma$.

Testing $\Delta$ is equivalent to testing $L_1$, which can be rewritten as $$L_1 = \prod_{j=2}^{N} Pr \left\{ \begin{array}{l} \{(X_j, Y_j) = (x_j, y_j), \\ S_{1j} = s_{1j} \mid (X_1, Y_1) = (x_1, y_1) \} \end{array} \right\} \quad \text{(eq. 10)}$$

$$= \frac{1}{A^{N-1}} \prod_{j=2}^{N} Pr \left\{ \begin{array}{l} \{S_{1j} = s_{1j} \mid (X_1, Y_1) = (x_1, y_1), \\ (X_j, Y_j) = (x_j, y_j)\} \end{array} \right\}$$

$$= \frac{1}{A^{N-1}} \prod_{j=2}^{N} Pr\{-L(d'_j) + N(0, \sigma) = s_{1j}\}$$

$$= \frac{1}{A^{N-1}} \prod_{j=2}^{N} \left( \frac{1}{\sqrt{2\pi}\,\sigma} e^{-\frac{(s_{1j}+L(d'_j))^2}{2\sigma^2}} \right)$$

$$= \frac{1}{(\sqrt{2\pi}\,\sigma A)^{N-1}} \exp\left( -\frac{\sum_{j=2}^{N}(s_{1j}+L(d'_j))^2}{2\sigma^2} \right).$$

Comparing $L_1$ with threshold $T_1$ is equivalent to testing $$\sum_{j=2}^{N}(s_{1j}+L(d'_j))^2 \quad \text{(eq. 11)}$$

Notice that in the derivations, AEP is not applied to $L_1$ because the signal strength observation is atypical if the $(x'_1, y'_1)$ is not correct (though this argument is not true if the difference between the incorrect database location and the true location of node 1 is very small).

Suppose the link quality value is quantized based on the connectivity requirement. For $S_{1j} \geq -L(d)$ and $S_{1j} < -L(d)$, let the quantized version $S_{1j}$ to be $M_1$ and $M_0$, respectively (assume $M_1 > M_0$). Notice $\hat{S}_{1j} = M_1$ and $S_{1j} = M_0$ corresponds to $a_{1j}^{LQ} = 1$ and $a_{1j}^{LQ} = 0$, respectively.

Applying the same quantization rule to $-L(d'_j)$, then the quantized version $-L(d_j)$ equals $M_1$ and $M_0$ corresponds to $a_{1j}^{DB} = 1$ and $a_{1j}^{DB} = 0$, respectively.

With this quantization, the test provides substantially similar results as the neighborhood metric test.

Optimal Threshold for the Neighborhood Metric Test

As previously noted, the likelihood ratio test may be based on the connectivity and/or link quality observations. Also provided was a neighborhood metric test as a simplification of the likelihood ratio test. In the neighborhood metric test, the neighborhood metric $m_i''$ of any node is compared to a threshold T to identify the incorrectness of the node location in the database. It is important to pick a proper threshold based on the implementation requirements. The optimal threshold problem is to pick a proper threshold to minimize the weighted sum of missed detection and false alarm probabilities, which is given by:

$$J(T) = p_m + \alpha \times p_f, \quad \text{(eq. 12)}$$

where $\alpha$ is a positive number indicating the relative importance of the false alarm probability to the missed detection probability. The optimal threshold was obtained through simulations in the previous section. In this section, an approximate analytical expression for the optimal threshold in the neighborhood metric test is derived.

Recall that the neighborhood metric for a node i is given by (eq. 6), which is the summation of the contributions from all the other nodes. Here, the contribution to the neighborhood metric of node i from node j is $m_{ij} = |a_{ij}^{DB} - a_{ij}^{LQ}|$.

Without loss of the generality, assume node 1 is the one we are interested in. We consider the missed detection probability first, that is, node 1 is mislabeled in the location database. Assume that the actual location of node 1 is $(x_1, y_1)$, and the location of node 1 in the database is $(x'_1, y'_1)$. Consider any other node j, whose location is $(x_j, y_j)$. Then the distance between node 1 and node j is $$d_j = \sqrt{(x_j-x_1)^2 + (y_j-y_1)^2},$$

and the distance between node j and the database location of node 1 is $$d'_j = \sqrt{(x_j-x'_1)^2 + (y_j-y'_1)^2}.$$

Recall that the communication range is d, and that two nodes are assumed to be connected if the distance between them is smaller than d based on the locations. Thus, $d'_j < d$, node 1 and j are connected due to the location database, i.e. $a_{ij}^{DB} = 1$. Then $m_{1j}$ equals 1 only if 1 and j are disconnected based on the link quality measurement. Notice $m_{1j}$ is a binary random variable taking values of 0 or 1. Considering the log-normal shadowing, we have $$p_m\{m_{1j}=1 \mid (x_1,y_1),(x'_1,y'_1),(x_j,y_j)\} = Pr\{a_{ij}^{LQ}=0\} = \quad \text{(eq. 13)}$$

$$Pr\{-L(d_j)+N(0,\sigma) < -L(d)\} = \Phi\left(\frac{10\rho}{\sigma}\log_{10}\frac{d_j}{d}\right),$$

where $\Phi(\cdot)$ is the cumulative distribution function of standard Gaussian random variable.

Since the break point distance is relatively small compared to the typical distance between nodes, a single slope path-loss model is used with the slope the same as the one after the break point distance. The deterministic component of the path-loss at distance x is thus given by $$L(x) = L_0 + 10\rho\log_{10}x.$$

On the other hand, if $d'_j \geq d$, the node 1 and j are disconnected ($a_{ij}^{DB} = 0$) according to the location database. Then $m_{1j}$ equals 1 only if 1 and j are connected based on the link quality measurement. Thus, we have $$p_m\{m_{1j}=1 \mid (x_1,y_1),(x'_1,y'_1),(x_j,y_j)\} = Pr\{a_{ij}^{LQ}=1\} = \quad \text{(eq. 14)}$$

$$Pr\{-L(d_j)+N(0,\sigma) > -L(d)\} = \Phi\left(-\frac{10\rho}{\sigma}\log_{10}\frac{d_j}{d}\right).$$

For the false alarm case, where the location database entry is correct, the distribution of $m_{1j}$ can be similarly derived.

$$p_f\left\{\begin{array}{l} m_{1j}=1 \mid (x_1,y_1), \\ (x'_1,y'_1),(x_j,y_j) \end{array}\right\} = \begin{cases} \Phi\left(\frac{10\rho}{\sigma}\log_{10}\frac{d_j}{d}\right) & \text{if } d_j < d; \\ \Phi\left(-\frac{10\rho}{\sigma}\log_{10}\frac{d_j}{d}\right) & \text{if } d_j \geq d. \end{cases} \quad \text{(eq. 15)}$$

Since the location of any node is uniformly distributed in certain area, taking the expectation over $(x_1,y_1)$, $(x'_1,y'_1)$, and $(x_j,y_j)$ yields the unconditional probabilities $p_m\{m_{1j}=1\}$ and $p_f\{m_{1j}=1\}$.

Since our assumption is that all the nodes are independently and uniformly located, $m_{1j}$'s are iid binary random variables for all j under both missed detection and false alarm cases. Therefore, the neighborhood decision metric $m_1''$ for node 1 is the summation of N−1 iid random variables, and it can be approximated by a Gaussian random variable according to the Central Limit Theorem.

$$m_1'' = \begin{cases} N(\mu_1,\sigma_1) & \text{missed detection case}; \\ N(\mu_2,\sigma_2) & \text{false alarm case}. \end{cases} \quad \text{(eq. 16)}$$

The means and standards deviations are given by:

$$\mu_1 = (N-1)p_m\{m_{1j}=1\}; \quad \text{(eq. 17)}$$

$$\sigma_1 = \sqrt{(N-1)p_m\{m_{1j}=1\}(1-p_m\{m_{1j}=1\})}; \quad \text{(eq. 18)}$$

$$\mu_2 = (N-1)p_f\{m_{1j}=1\};  \quad \text{(eq. 19)}$$

$$\sigma_2 = \sqrt{(N-1)p_f\{m_{1j}=1\}(1-p_f\{m_{1j}=1\})}. \quad \text{(eq. 20)}$$

Therefore, the optimal threshold is given by $$T^{n*} = \underset{T^n}{\arg\min}\left( \begin{array}{c} Pr\{\text{Missed detection}|T^n\} + \\ \alpha Pr\{\text{False alarm}|T^n\} \end{array} \right) \quad \text{(eq. 21)}$$

$$= \underset{T^n}{\arg\min}\left( \begin{array}{c} Pr\{N(\mu_1, \sigma_1) < T^n\} + \\ \alpha Pr\{N(\mu_2, \sigma_2) > T^n\} \end{array} \right)$$

$$= \underset{T^n}{\arg\min}\left( \Phi\left(\frac{T^n-\mu_1}{\sigma_1}\right) + \alpha\left(1 - \Phi\left(\frac{T^n-\mu_2}{\sigma_2}\right)\right)\right).$$

However, computing the closed form expression of the means and the standard deviations under both cases requires the values of the missed detection and false alarm probabilities, but it is not trivial to obtain those values.

To further simplify the expression for the optimal threshold in this section. Let the following equation define the objective function to minimize.

$$J(T) = \left(\Phi\left(\frac{T-\mu_1}{\sigma_1}\right) + \alpha\left(1 - \Phi\left(\frac{T-\mu_2}{\sigma_2}\right)\right)\right) \quad \text{(eq. 22)}$$

It is noted that $p_m\{1_j=1\}$ is usually larger than $p_f\{m_{1j}=1\}$ due to the small portion of incorrect location nodes. The optimal threshold if $p_m\{m_{1j}=1\}$ and $p_f\{m_{1j}=1\}$ are known, is provided as follows:

$$T = \frac{-\left(\frac{\mu_1}{\sigma_1^2} - \frac{\mu_2}{\sigma_2^2}\right) + \sqrt{\left(\frac{\mu_1}{\sigma_1^2} - \frac{\mu_2}{\sigma_2^2}\right)^2 - 4\left(-\frac{1}{\sigma_1^2} + \frac{1}{\sigma_2^2}\right)\left(\left(-\frac{\mu_1^2}{\sigma_1^2} + \frac{\mu_2^2}{\sigma_2^2}\right) - \log\alpha\frac{\sigma_1}{\sigma_2}\right)}}{-\frac{2}{\sigma_1^2} + \frac{2}{\sigma_2^2}}. \quad \text{(eq. 23)}$$

As described herein, techniques, methodologies and apparatus are provided to enable the validation of location information associated with one or more access points (APs) in a wireless local area network (WLAN). These techniques, methodologies and apparatus generally comprise retrieving, from a memory storing the database, neighborhood node location information associated with the AP; receiving, from the AP, neighborhood node proximity information; and comparing the retrieved neighborhood node location information to the received neighborhood node proximity information using a likelihood ratio test (LRT) in which the likelihood that the location as recorded in the database is correct is compared to the likelihood that the location as recorded in the database is incorrect.

The above embodiments may be modified by using neighborhood node proximity information comprising a list of nodes exhibiting at the AP a signal strength above a threshold level T and/or link quality information associated with those nodes having a signal received by the AP. The comparison of database-retrieved neighborhood node location information to AP provided neighborhood node proximity information may be performed using adjacency matrices.

The various embodiments may be realized within the context of a network management system (NMS), such as computer implemented NMS. Broadly speaking, the embodiments may be reduced to software instructions stored on a computer readable medium that, when executed by a processor, perform the various function described herein with respect to the embodiments. Similarly, computing apparatus including a memory for storing such instructions and a processor for executing such instruction may also be used to practice the invention.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

The invention claimed is:

1. A method for validating location information associated with an access point (AP) in a wireless local area network (WLAN), the location information being stored within a database, the method comprising:
    retrieving, from a memory storing the database, neighborhood node location information associated with the AP;
    receiving, from the AP, neighborhood node proximity information; and
    comparing the retrieved neighborhood node location information to the received neighborhood node proximity information using a likelihood ratio test (LRT) in which the likelihood that the location as recorded in the database is correct is compared to the likelihood that the location as recorded in the database is incorrect.

2. The method of claim 1, wherein the neighborhood node proximity information received from the AP comprises a list of nodes exhibiting at the AP a signal strength above a threshold level T.

3. The method of claim 1, wherein the neighborhood node proximity information received from the AP comprises link quality information associated with those nodes having a signal received by the AP.

4. The method of claim 2, wherein the signal strength threshold level T is indicative of a node within n-hops of the AP.

5. The method of claim 4, wherein n is 1, 2 or 3.

6. The method of claim 2, further comprising:
    forming a first adjacency matrix using the neighborhood node location information retrieved from the database; and
    forming a second adjacency matrix using the neighborhood node proximity information received from the AP;
    wherein the comparing neighborhood node location information comprises comparing the first and second adjacency matrixes.

7. The method of claim 3, further comprising:
    forming a first adjacency matrix using the neighborhood node location information retrieved from the database; and
    forming a second adjacency matrix using the neighborhood node proximity information received from the AP;
    wherein the comparing neighborhood node location information comprises comparing the first and second adjacency matrixes.

8. The method of claim 1, wherein the LRT is performed substantially in accordance with the following equation:

$$m_1^n = \sum_{1 \leq j \leq N, j \neq 1} |a_{1j}^{DB} - a_{1j}^{LQ}|.$$

9. The method of claim 1, wherein the LRT is performed using a perceived connectivity of nodes proximate the AP.

10. The method of claim 1, wherein the LRT is performed using an actual link quality of nodes proximate the AP.

11. The method of claim 1, wherein the neighborhood node proximity information received from the AP comprises the signal strength of each of the nodes capable of communicating with the AP.

12. The method of claim 2, wherein the threshold level T is determined using propagation parameters associated with the WLAN.

13. The method of claim 1, wherein the nodes proximate the AP comprise those nodes within 1 hop of the AP.

14. The method of claim 1, wherein the nodes proximate the AP comprise those nodes within 2 hops of the AP.

15. The method of claim 1, wherein the method is repeated for each of a plurality of APs within the network.

16. The method of claim 15, wherein the location information being stored within a database for each AP is updated in response to location information validated for multiple APs.

17. A non-transitory computer readable medium for storing software instructions which, when executed by a processor, perform a method for validating location information associated with an access point (AP) in a wireless local area network (WLAN), the location information being stored within a database, the method comprising:
retrieving from the database neighborhood node location information associated with the AP;
receiving, from the AP, neighborhood node proximity information; and
comparing a neighborhood metric of a node to a threshold value determined using a neighborhood metric test to determine thereby whether the neighborhood node location information received from the database includes any errors.

18. Computing apparatus comprising a memory for storing computer instructions and a processor for executing the stored instructions, wherein the software instructions adapt the operation of the computer to perform a method for validating location information associated with an access point (AP) in a wireless local area network (WLAN), the location information being stored within a database, the method comprising:
retrieving from the database neighborhood node location information associated with the AP;
receiving, from the AP, neighborhood node proximity information; and
comparing a neighborhood metric of a node to a threshold value determined using a neighborhood metric test to determine thereby whether the neighborhood node location information received from the database includes any errors.

19. The computing apparatus of claim 18, wherein the computing apparatus is part of a network management system.

20. A method for validating location information associated with an access point (AP) in a wireless local area network (WLAN), the location information being stored within a database, the method comprising:
retrieving from the database neighborhood node location information associated with the AP;
receiving, from the AP, neighborhood node proximity information; and
comparing a neighborhood metric of a node to a threshold value determined using a neighborhood metric test to determine thereby whether the neighborhood node location information received from the database includes any errors.

* * * * *